June 28, 1932. F. J. OVEN 1,864,854
GASKET
Filed April 29, 1931
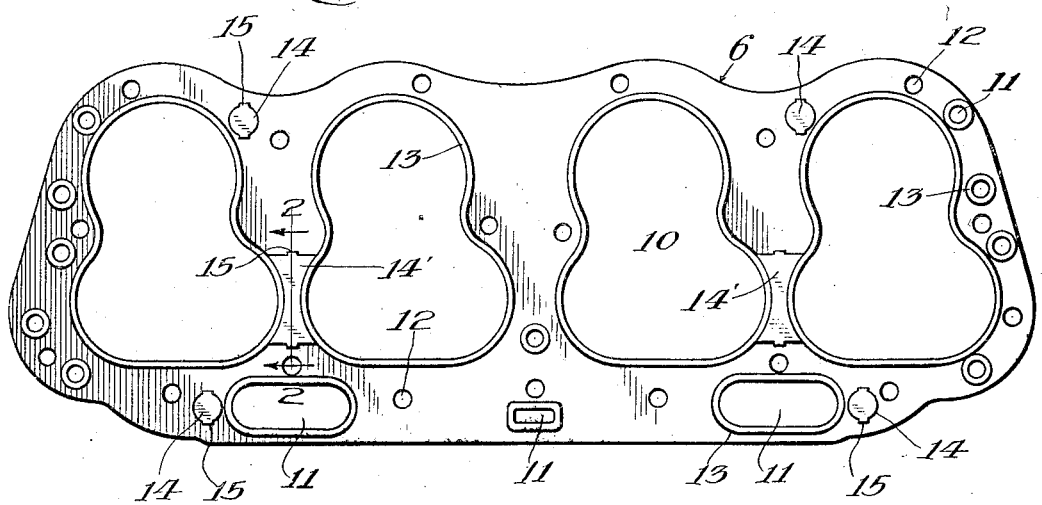
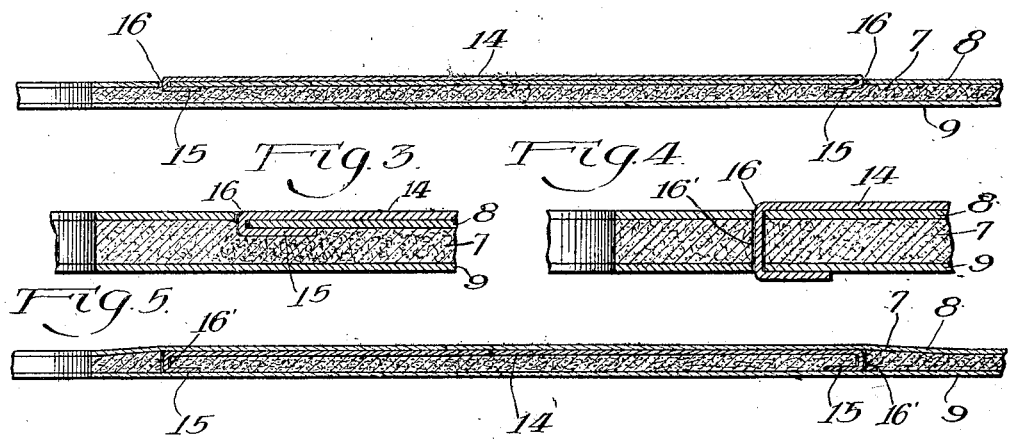
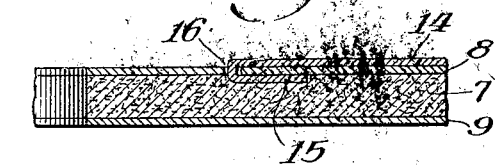
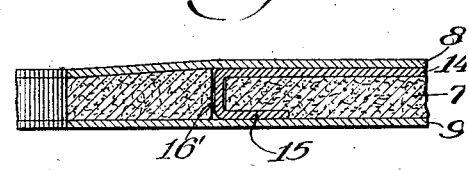
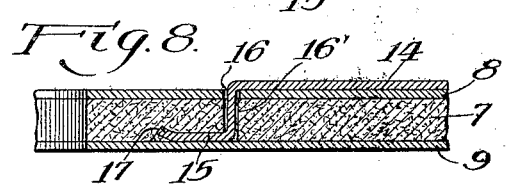
Inventor:
Frank J. Oven,
By Wm. O. Belt Atty Patented June 28, 1932

1,864,854

UNITED STATES PATENT OFFICE

FRANK J. OVEN, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed April 29, 1931. Serial No. 533,767.

This invention relates to gaskets and more particularly to cylinder head gaskets for internal combustion engines.

At times it is found desirable to shut off or plug a water passage in a cylinder block and head to reduce the water circulation in the engine. Sometimes this can be effectively accomplished by omitting the water hole in making the gasket and depending upon the body of the gasket to block the water passage, but this will not always insure against leaks and it has been found desirable to provide a shim or washer so that the gasket will have additional thickness at the water hole to form a tight seal, under the pressure applied in securing the gasket in place, blocking the water passage and preventing leaks at the blocked passage. Sometimes it is desirable to provide a shim at a narrow section of the gasket to reenforce the gasket.

The object of the invention is to provide a shim of novel construction which can be easily and permanently secured in place on the gasket to provide such additional thickness as may be desired to enable the gasket to effectively block a water passage in the engine and form an efficient seal at the block passage or to reenforce and strengthen a narrow section of the gasket.

I have illustrated the invention in one type of cylinder head gasket and referring thereto Fig. 1 is a plan view of the gasket.

Fig. 2 is an enlarged sectional view on the line 2—2 of Fig. 1.

Figs. 3 and 4 are detail enlarged sectional views showing other embodiments of the invention.

Fig. 5 is an enlarged sectional view similar to Fig. 2 but showing a different embodiment of the invention.

Figs. 6 and 7 are detail enlarged sectional views of the embodiments shown in Figs. 2 and 5 respectively.

Fig. 8 is an enlarged detail sectional view showing another embodiment of the invention.

The type of gasket 6, shown in Fig. 1, is selected for purposes of illustration only and it will be understood that the invention is not restricted to this or to any other particular type of gasket but may be used in any gasket for which it is now or may hereafter be adapted. The gasket illustrated comprises an intermediate layer 7 of asbestos or other suitable gasket material arranged between an upper layer 8 and a lower layer 9, preferably made of thin metal. The gasket has combustion openings 10, water openings 11 and bolt openings 12. The edges about the combustion and water openings are protected by flanges 13 which also secure the several layers together. A shim is provided on the gasket wherever it is desired to block a water passage and I have shown several of these shims 14 in the drawing. The shim may be made in any size and in any shape required or desired and it is provided with tongues 15 for fastening the shim on the gasket. The shim may be arranged on the outer side of one of the metal layers, as 8 for example, and the tongues passed through slits 16 in said layer and folded against the underside of the layer, Figs. 2, 3, 6. Or the shim may be arranged beneath one of the metal layers and upon one side of the asbestos layers and the tongues passed through slits 16' in the asbestos layer and folded against the other side thereof, as shown in Figs. 5 and 7. Or the shim may be arranged on one side of the gasket and the tongues passed entirely through the gasket and folded against the other side thereof as shown in Fig. 4. Or the shim may be arranged on the outer side of one of the metal layers, as 8 for example, and the tongues passed through said layer and through the asbestos layer and folded against the underside of the asbestos layer and within the other metal layer as shown in Fig. 8. It is preferred to provide the layers with slits 16 and 16' in the blanking operation of the layers to receive the tongues and thereby effect accurate location of the shim on the gasket. In assembling the layers and the shim, sufficient pressure may be applied to compress the gasket at the shim as shown in Fig. 3 but this is not essential and the gasket layers and shim may be assembled without this compression, as indicated in other figures, or the compression may be slight and not sufficiently noticeable to be shown in the drawing. When a gasket which has not been compressed at the shim, and which has been only slightly compressed, is secured in place between the head and block of an engine, for example, it becomes highly compacted at the shim because of the additional thickness afforded by the shim, and this condition is at least partly produced when the gasket is compressed because of the shim in manufacture, as shown in Fig. 3. This compacting of the gasket due to the shim makes the gasket harder and more resistant at the shim and increases its ability to resist the pressure of water and other fluids and maintain an efficient seal. The shim is preferably made of the same material as the metal layers and it may be thin sheet copper, for which reason I prefer to cut the slits 16 so that the tongues may be easily passed through the metal layer or the asbestos layer. While it is desirable to cut slits 16 and 16' in blanking the gasket layers to accurately locate the shim and to facilitate uniting the shim with the layer or layers, it may be desirable in some cases to make the shim of sufficiently stiff material and to point the prongs sharply so that they may be forced through the metal layer or layers and forced into or through the asbestos layer. The shim will ordinarily be applied to the layer or layers before the gasket is completely assembled and the prongs may be clenched at their extreme ends as shown at 17 in Fig. 8. The prongs may be bent inwardly as shown in Figs. 2-7, or they may be bent outwardly as shown in Fig. 8. It is desirable that the shim should be of greater size than the water passage which it is to assist in blocking so that it may overlap the marginal edges of the passage and form an efficient seal under the pressure which is applied in securing the gasket in place to prevent leakage at the passage. As many tongues may be provided on the shim as will be found necessary or desirable for securing it in place. The shim may be used for protecting narrow sections of a gasket which may be necessary to fit an engine design in which, for example, combustion openings are located close together. In Fig. 1, I have shown two such shims 14' located in narrow sections of the gasket where the combustion openings are close together. These shims 14' reenforce and strengthen the gasket in handling and in use, they assist in providing an efficient seal in the narrow section of the gasket to prevent gas leakage, and thereby they prolong the life of the gasket.

I have shown and described the invention in simple forms to illustrate the construction and use thereof but I do not limit myself to this particular disclosure and reserve the right to make the shim in any form and material and to use it for any purpose for which it is or may be adapted within the scope of the following claims:

I claim:

1. A gasket comprising outer metal layers and an interposed layer of gasket material, a shim applied to one side of one of the outer layers, one of said layers having slits and said shim having tongues engaging said slits to secure the shim in place against said outer layer.

2. A gasket comprising outer metal layers and an interposed layer of gasket material, one of said layers having slits therein, a shim applied to one side of said slitted layer, and tongues on said shim projecting through said slits and folded against one of said layers to secure the shim against the slitted layer.

3. A gasket comprising two layers of gasket material arranged one upon the other, a shim interposed between said layers, and tongues on the shim interlockingly engaging one of said layers to secure the shim thereto.

4. A gasket comprising an intermediate layer and facing layers of gasket material, one of said facing layers having slits therein, a shim applied to one face of said slitted layer, and tongues on said shim projected through said slits and folded against the other face of said slitted layer.

5. A gasket comprising an intermediate layer and facing layers of gasket material, the intermediate layer having slits therein, a shim arranged on one side of said intermediate layer and beneath the adjacent facing layer, and tongues on said shim projected through said slits and folded on the other side of the intermediate layer to secure the shim thereto.

6. A gasket comprising a plurality of superimposed layers of gasket material, a shim applied to said gasket, and tongues on said shim and passing through the layers to secure the shim on the gasket.

7. A gasket comprising an intermediate layer and facing layers of gasket material, one of the facing layers and the intermediate layer having slits therein, a shim applied to the outer side of said slitted facing layer, and tongues on said shim projected through the slits in the slitted facing layer and the intermediate layer and folded upon the intermediate layer to secure the shim in place.

FRANK J. OVEN.